(12) United States Patent
Heim et al.

(10) Patent No.: US 7,167,171 B2
(45) Date of Patent: Jan. 23, 2007

(54) METHODS AND APPARATUSES FOR A POLYGON BINNING PROCESS FOR RENDERING

(75) Inventors: Oliver A. Heim, Cameron Park, CA (US); Stephen Junkins, Austin, TX (US); Lance Raymond Alba, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 239 days.

(21) Appl. No.: 10/881,668

(22) Filed: Jun. 29, 2004

(65) Prior Publication Data

US 2005/0285850 A1 Dec. 29, 2005

(51) Int. Cl.
*G06T 1/00* (2006.01)
*G06T 1/60* (2006.01)
*G09G 5/36* (2006.01)

(52) U.S. Cl. ........................ 345/418; 345/530; 345/545
(58) Field of Classification Search ................ 345/582, 345/501, 418, 419, 545, 530
See application file for complete search history.

(56) References Cited

U.S. PATENT DOCUMENTS

| | | | | |
|---|---|---|---|---|
| 5,999,189 A | * | 12/1999 | Kajiya et al. ............... | 382/232 |
| 6,323,860 B1 | * | 11/2001 | Zhu et al. .................... | 345/427 |
| 6,344,852 B1 | * | 2/2002 | Zhu et al. .................... | 345/418 |
| 6,437,780 B1 | * | 8/2002 | Baltaretu et al. ........... | 345/423 |
| 6,693,637 B1 | * | 2/2004 | Koneru et al. .............. | 345/501 |
| 6,975,318 B1 | * | 12/2005 | Junkins et al. .............. | 345/423 |
| 2005/0052455 A1 | * | 3/2005 | Long et al. .................. | 345/422 |

* cited by examiner

*Primary Examiner*—Ulka Chauhan
*Assistant Examiner*—Jason M. Repko
(74) *Attorney, Agent, or Firm*—Blakely, Sokoloff, Taylor & Zafman LLP

(57) ABSTRACT

Various methods, apparatuses, and systems are described in which subdivided polygons are derived from a first polygon. Bin assignments of subdivided polygons derived from a first polygon may be stored. One or more reference coordinate points associated with coordinates of the first polygon may be stored. One or more reference coordinate points associated with the coordinates of the first polygon on a subsequent frame may be compared to the stored one or more reference coordinate points from a previous frame. The bin assignments for the corresponding subdivided polygons for the subsequent frame may be reused if the results of the comparison are within a preset threshold quantity.

22 Claims, 9 Drawing Sheets

METHODS AND APPARATUSES FOR A POLYGON BINNING PROCESS FOR RENDERING

FIELD

Aspects of embodiments of the invention relate to a polygon (e.g., triangle) binning process for use in a tile-based rendering system.

BACKGROUND

A virtual 3D model (or simply "3D model") can be composed of polygons, such as triangles, which represent the skin of the 3D model. Typically, a rasterization engine draws polygons from the 3D model onto a two-dimensional (2D) surface, such as a computer screen. Typical rasterization engines draw the entire frame buffer at once. A more efficient method can be to break up the frame buffer into individual subsections (tiles) and to render them individually. Each tile usually includes rendering information on one or more polygons or, more typically, a portion of one or more polygons.

Tile based rendering is a hard ware architecture that may be used for rendering real time 3D graphics. The display device is partitioned into a grid of equal sized tiles. Typically, the size of the tile is equal to the size of the render cache, thereby allowing for reduced state changes when switching from one tile to another. Several algorithms, one of which is known as Tile Binning algorithm as well as Tile Assignment algorithm, may support the architecture.

A polygon binning process may be used to reduce the amount of tiles that each polygon can be possibly assigned to. The polygon binning process tries to exclude tiles that do not include any polygons or portions thereof prior to rasterization. The binning process also accomplishes some rasterization setup by identifying which polygons are contained by each tile. By doing this, the amount of processing that must be performed by the rasterization engine is reduced. Current tiling processes may overestimate the number of tiles to which a polygon belongs. Substantial computation may be required to determine which bins each polygon must be submitted to. Further, significant bandwidth may be required to transmit geometry information to the graphics hardware. Although a scene may be static, typically, all scene polygons generally are required by the graphics hardware to render each frame of the scene.

BRIEF DESCRIPTION OF THE DRAWINGS

The drawings refer to embodiments of the invention in which.

Figure 1:
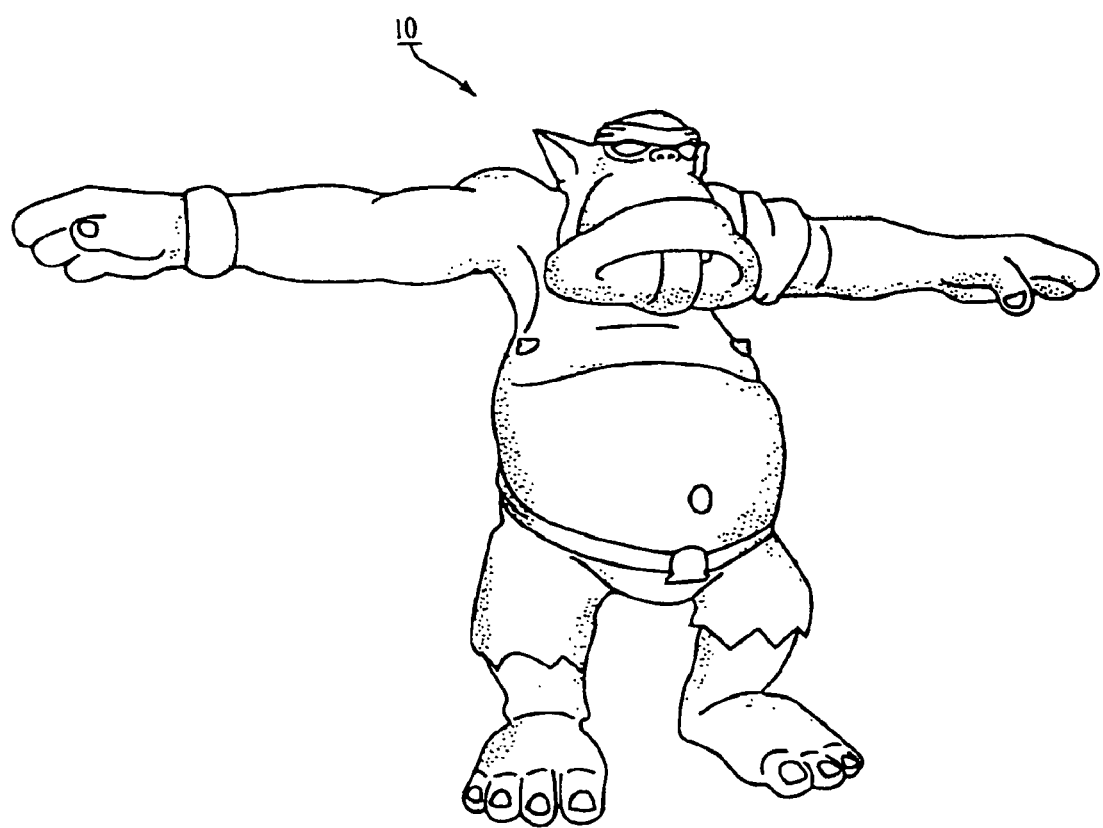
FIG. 1 illustrates a diagram of a 3D model.

While the invention is subject to various modifications and alternative forms, specific embodiments thereof have been shown by way of example in the drawings and will herein be described in detail. The embodiments of the invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, number of tiles, etc., in order to provide a thorough understanding of some embodiments of the invention. It will be apparent, however, to one of ordinary skill in the art that the embodiments of the invention may be practiced without these specific details. However, the specific numeric reference should not be interpreted as a literal sequential order but rather interpreted that the first tile is different than a second tile. Thus, the specific details set forth are merely exemplary. The specific details may be varied from and still be contemplated to be within the spirit and scope of the present invention.

In general, various methods and apparatuses are described that use a tile based rendering algorithm. One or more polygons may be in a model in each frame on a display screen. Each polygon may be divided into two or more subsequent polygons smaller in individual area than the initial polygon. Bin assignments may be calculated for the corresponding subdivided polygons. A first subdivision record for each polygon intended to be subdivided may be created that indicates bin assignments for its corresponding subdivided polygons. The bin assignments that the corresponding subdivided polygons belong to may be stored in the respective subdivision record. One or more reference coordinate points associated with the coordinates of the initial polygons may be stored in the subdivision record or a memory, such as a register, buffer, etc. The initial polygon may be rendered. The one or more reference coordinate points associated with the coordinates of the initial polygons on a subsequent frame may be compared to the stored one or more reference coordinate points from the previous frame. The bin assignments for the corresponding subdivided polygons may be reused on the subsequent frame if the results of the comparison are within a preset threshold quantity. A second subdivision record for the initial polygons may be created that indicates new bin assignments for its corresponding subdivided polygons if the results of the comparison are above the preset threshold quantity. The one or more reference coordinate points associated with the coordinates of the initial polygons may again be stored to replace the initial stored reference coordinate points.

Figure 2:
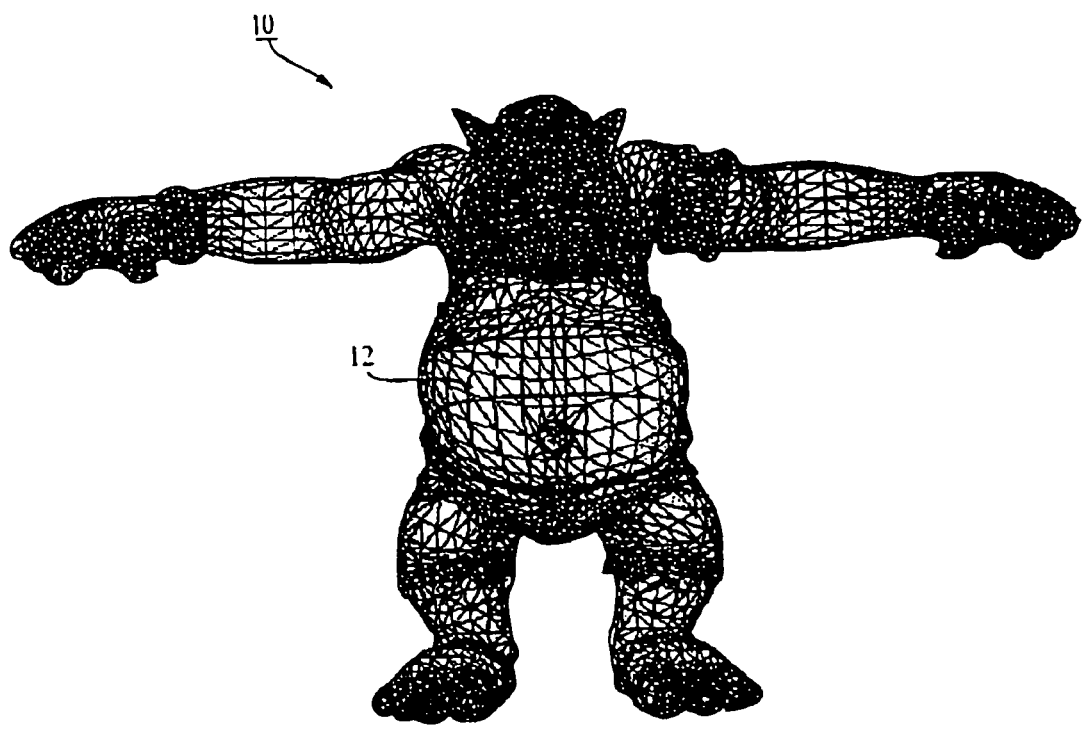
FIG. 2 illustrates a diagram of individual polygons making the 3D model.

FIG. 1 illustrates a diagram of a 3D model, which is rendered from 3D data. 3D model 10 may be rendered from 3D data. FIG. 2 illustrates a diagram of individual polygons making the 3D model 10. As shown in FIG. 2, 3D model 10 is comprised of many interconnecting polygons, for example a first polygon 12. Polygons may be triangles, rectangles, etc. The polygons 12 define the "skin" surface of 3D model 10.

Figure 3:
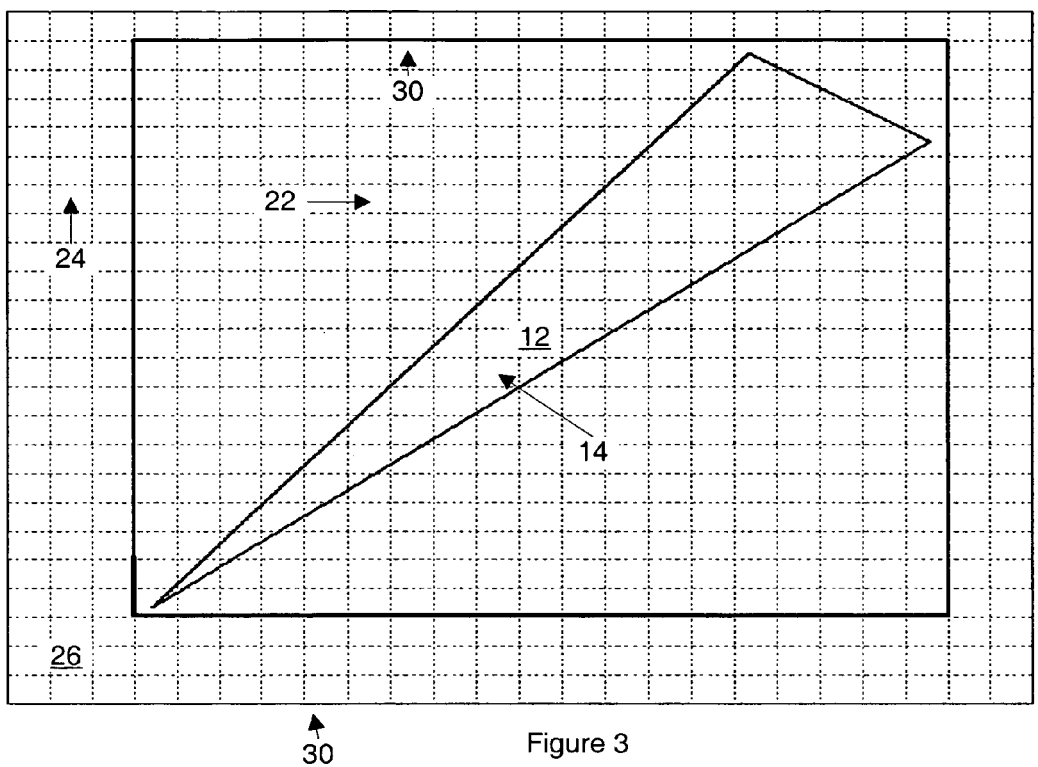
FIG. 3 illustrates a diagram of a polygon spanning across a portion of a display screen partitioned into a grid array of tiles.

FIG. 3 illustrates a diagram of a polygon spanning across a portion of a display screen partitioned into a grid array of tiles. The display screen may be partitioned into grid of rectangular tiles. A 24×24 tile section of that display screen 30 may contain one or more polygons from the model, such as the first polygon 12. A rasterization engine may draw the polygons onto the display screen. The rasterization engine draws the polygons making up the 3D model onto this two-dimensional (2D) surface, such as a handheld display screen. The rasterization engine may take as parameters a list of 2D polygons in screen space coordinates and a list of 2D vertices with vertex attributes.

Referring to FIG. 1, the animation of a 3D model 10 can be defined by a sequence of frames, which constitute snapshots of the 3D model at different points in time. Each frame contains information about the position of the 3D model in 3D space at a particular point in time. Data (i.e., polygons) for each frame of the animation can be stored in a memory such as a frame buffer. The frame buffer can be subdivided into smaller portions called tiles. The frame buffer stores the modeling information associated with these polygons in these tiles.

Referring to FIG. 3, the tiles store information corresponding to rectangular (e.g., square) portion of a display screen. For example, a first tile 14 stores information corresponding to that rectangular portion of the display screen. One or more polygons may occupy a single tile or, alternatively, a single polygon may occupy several tiles.

Tile Based Rendering may optimize rasterization for both hardware and software rasterization implementations. The rectangular partitions (known as tiles) of the display buffer are rasterized individually instead of rasterizing the entire frame buffer at once. Accordingly, the Rasterization Engine may but does not need to allocate space for a full frame buffer. Instead the Rasterization Engine may allocate merely space sufficient to store, for example, a single tile. During the rendering of a single frame, the tile space is recycled for each tile until all tiles comprising the entire frame buffer have been rasterized. Current tiling processes may overestimate the number of tiles to which a polygon belongs. Improving the accuracy of this estimation reduces needless computations.

Figure 4:
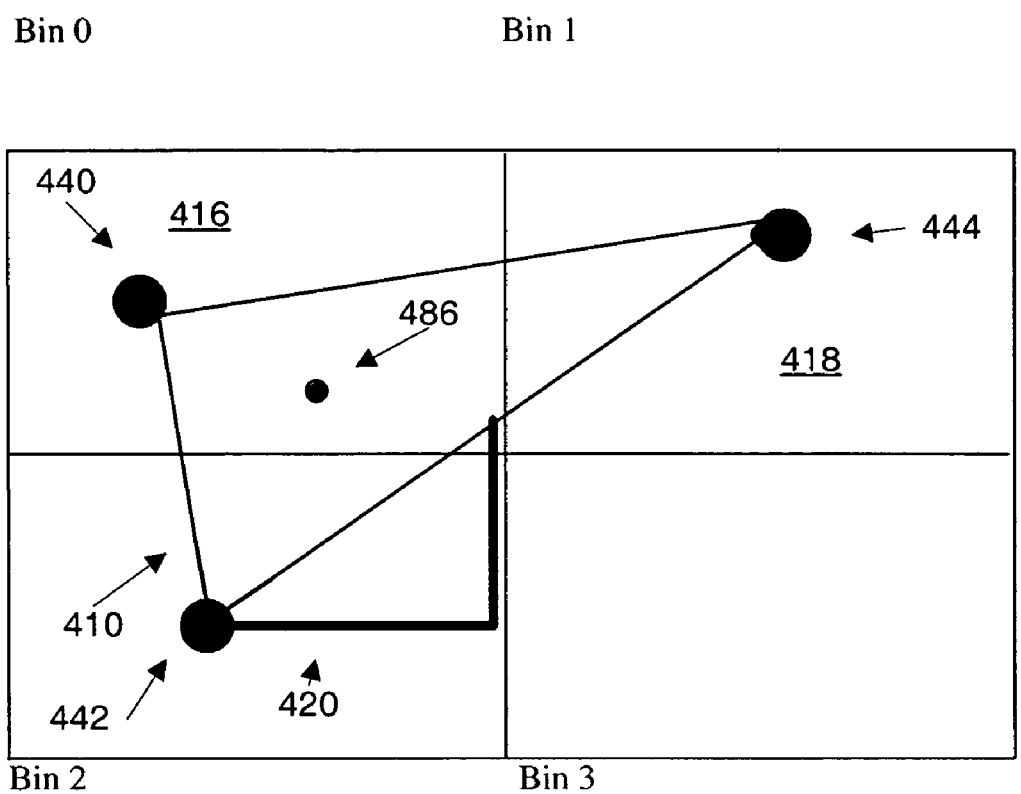
FIG. 4 illustrates a diagram of an embodiment of polygons crossing several tiles and the bins associated with those tiles.

FIG. 4 illustrates a diagram of an embodiment of polygons crossing several tiles and the bins associated with those tiles. Referring to FIG. 4, each tile may have a bin associated with that tile. A tile, such as a second tile 416, may store an array of pixel data such as a 16×16 pixel array. The touching of a tile by polygons 410 and 420 is indicated by the presence (or absence) of the triangles' identifiers in a "bin" associated with that tile. For example, the bin associated with the second tile 416, bin-0, may indicate that both the first polygon 410 is crosses the second tile 416 as well as the second polygon 420 crosses that tile. The bin associated with a third tile 418, bin-1, indicates that merely the first polygon 410 crosses the third tile 418 because the second polygon does not touch the third tile 418.

Figure 5A:
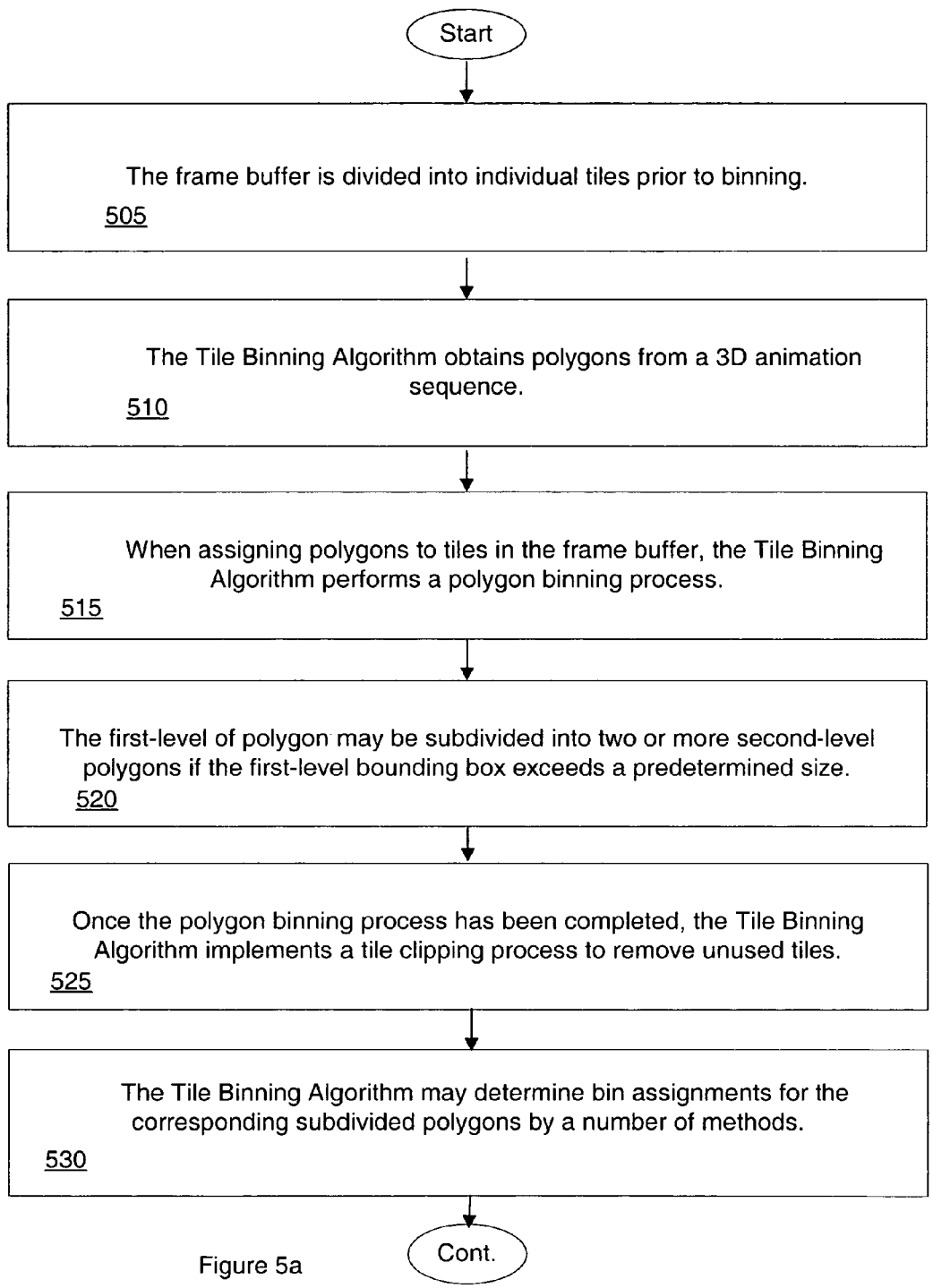
FIGS. 5*a*–5*c* illustrate a flow diagram of an embodiment of reducing the computation of a polygon bin assignment by exploiting the spatial locality of polygons between frames and allowing the computations to be shared across multiple rendering frames.
Figure 5B:
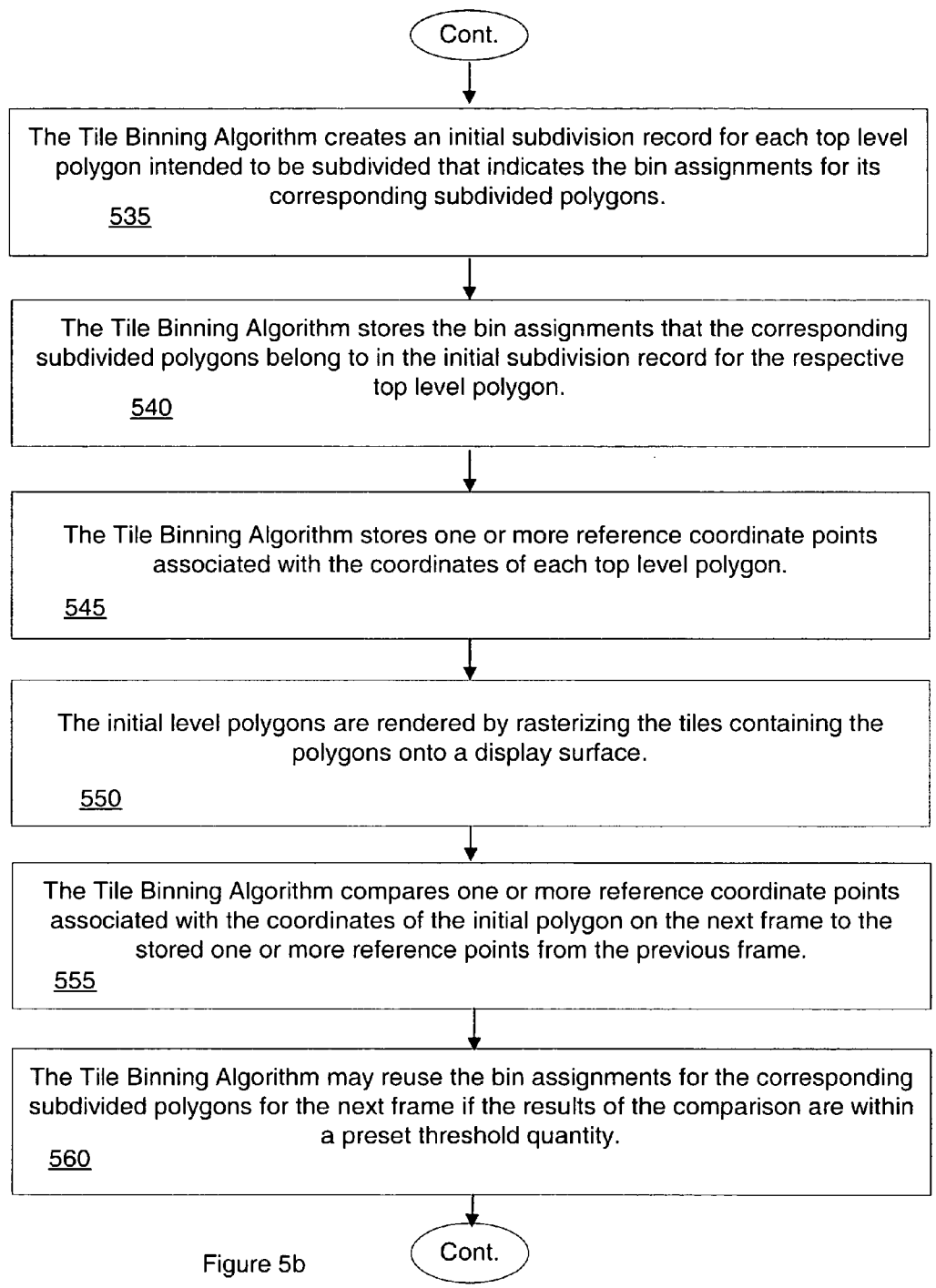
Figure 5C:
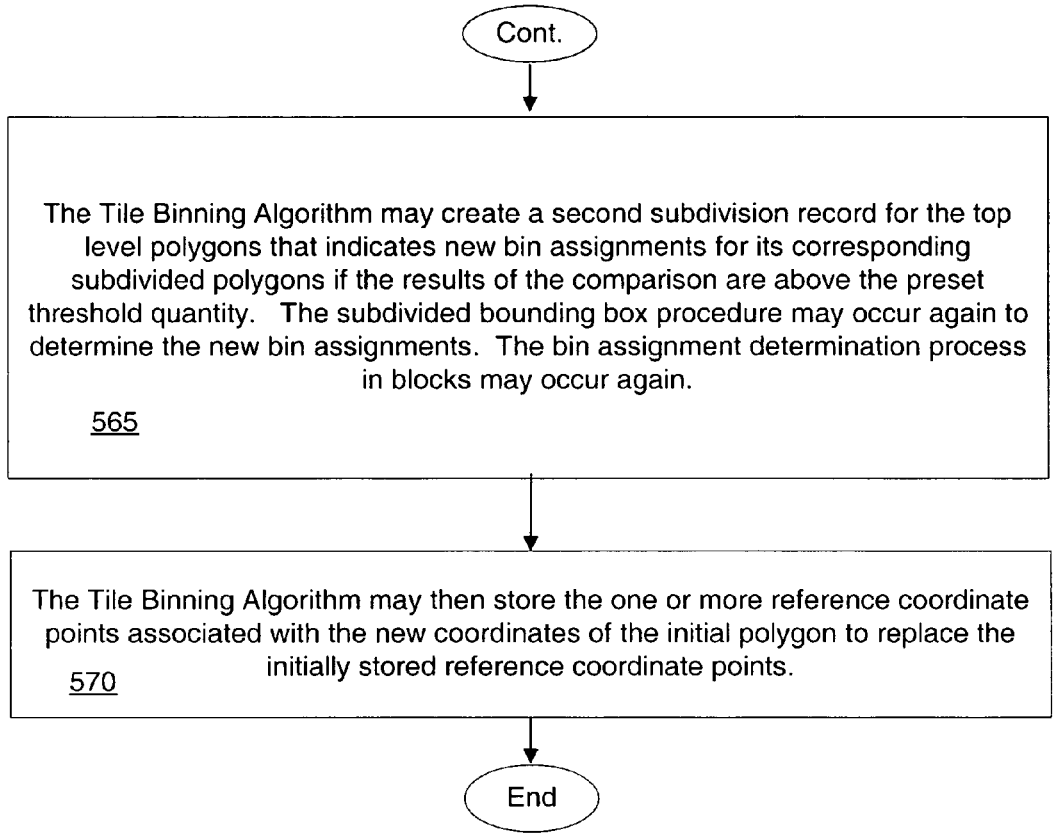

FIGS. 5a–5c illustrate a flow diagram of an embodiment of reducing the computation of a polygon bin assignment by exploiting the spatial locality of polygons between frames and allowing the computations to be shared across multiple rendering frames. Referring to FIG. 5, the process allows drawing polygons from a 3 dimensional model onto a 2 Dimensional display screen. The process includes a polygon binning process, which reduces the possible number of tiles that a polygon is assigned to in a frame buffer. The number of tiles that a given polygon should be submitted to for binning may be reduced through a subdivision approach on a large initial polygon. The computational requirements for tile binning to determine triangle bin assignment may further be reduced by allowing computations to be shared across multiple rendering frames.

In block 505, the frame buffer is divided into individual tiles prior to binning. For example, a typical frame buffer might be 512×512 pixels. A typical size of a tile might be 32×32 pixels, yielding a partitioning of 16×16 tiles. The Tile Binning algorithm may decide which polygons belong to which tiles based on their screen space locations (e.g. post camera and viewport transform). The Tile Binning algorithm attempts to assign polygon merely to tiles in which they cross and thus will actually provide rasterize pixel data to fill the polygon. Some polygons fall exactly within the boundaries of a single tile and therefore require assignment to only one tile. However, most triangles will cross at least two or more tiles and require submission to all candidate tiles. Large (relative to frame buffer coverage) problematic irregularly aligned polygons will cover many tiles. An ideal Tile Binning Algorithm efficiently assigns the polygons to solely the exact tiles which that polygon covers.

In block 510, the Tile Binning Algorithm obtains polygons from a 3D animation sequence. The polygons may be obtained from a single frame of the 3D animation. The Tile Binning Algorithm assigns polygons from the frame to tiles in a frame buffer. FIG. 3 shows an example of a first polygon 12 and tiles 26 in the frame buffer. As shown, the first polygon 12 extends over a number of tiles in the frame buffer.

The next block refers to FIG. 5a and FIG. 3.

In block 515, when assigning polygons to tiles in the frame buffer, the Tile Binning Algorithm performs a polygon binning process. The polygon binning process includes constructing a bounding box 30 around the first polygon 12. The polygons may be submitted one at a time from memory and tested against bins. The bounding box 30 may be a rectangle that is just large enough to encompass the entirety of the first polygon 12 without including excess tiles along either the X-axis or the Y-axis. Thus, an initial rectangular bounding box is formed around an initial-level polygon. The first-level bounding box 30 includes tiles that contain the first-level polygon data, such as the first tile 14, and some tiles outside of the boundary of the first level polygon, such as the fourth tile 22. However, the remainder of the tiles in the display grid, such as the fifth tile 24, that fall outside of the boundaries of the bounding box 30 are excluded from the binning assignment process for this polygon. The tiles of the frame buffer that are within the bounding box 30 are marked as potential bins that the polygon may belong to. Marking the tiles in this manner distinguishes tiles inside the bounding box from tiles outside the bounding box.

In block 520, the initial-level of polygon may be subdivided into two or more second-level polygons if the first-level bounding box exceeds a predetermined size.

Figure 6:
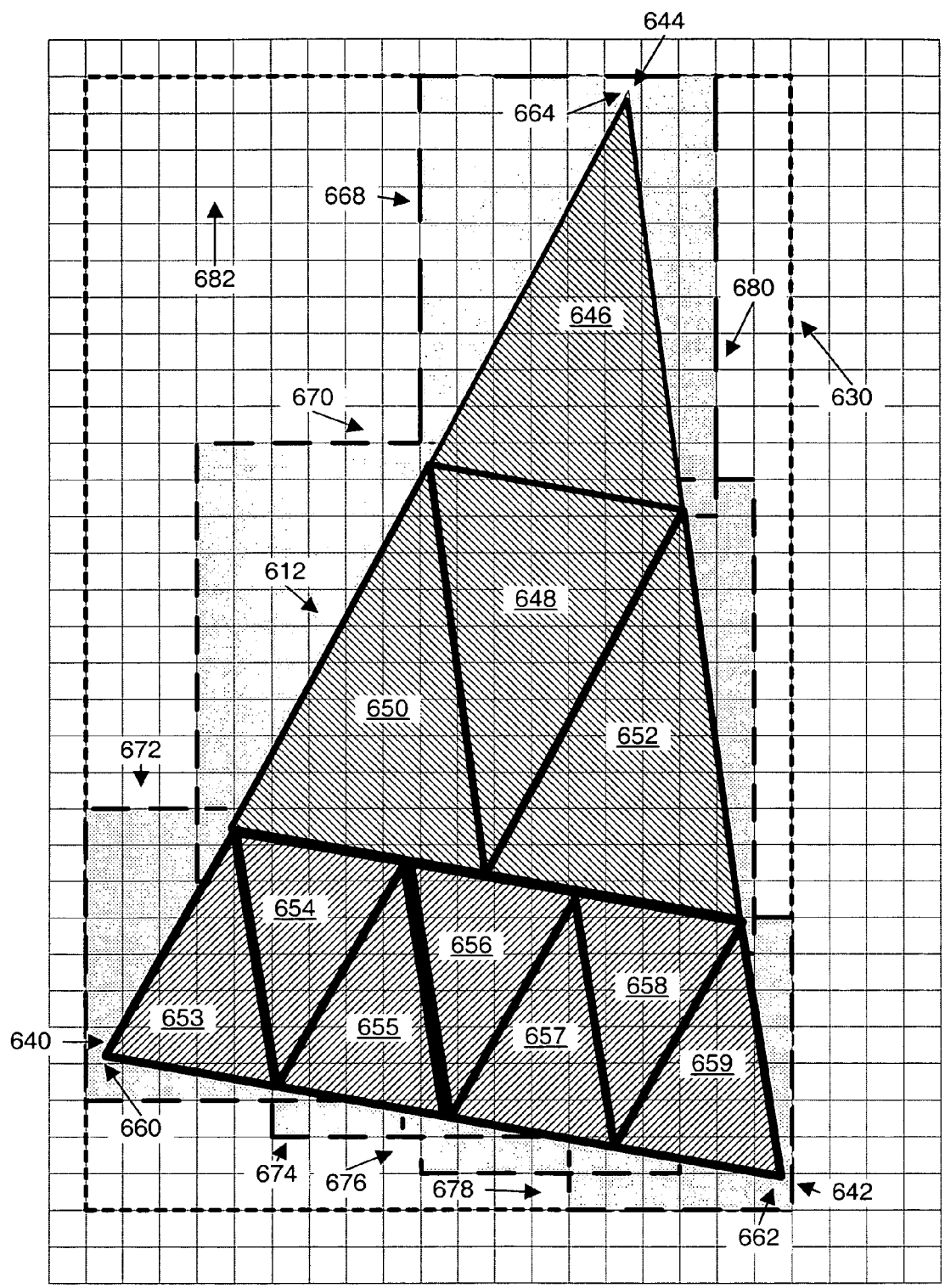
FIG. 6 illustrates diagram of an embodiment of the initial-level of polygon as well as the subsequent levels of polygons subdivided into two or more second-level polygons if a given bounding box exceeds a predetermined size.

FIG. 6 illustrates diagram of an embodiment of the initial-level of polygon as well as the subsequent levels of polygons subdivided into two or more second-level polygons if a given bounding box exceeds a predetermined size. The initial polygon 612 spans across a range of tiles from the fourth tile 640 to the fifth tile 642 to the sixth tile 644. An initial bounding box 630 may be formed around the initial polygon 612 if the size of either the initial polygon or bounding box is above a preset threshold. The remainder of the text will assume that the preset threshold is based on the size of the bounding box.

Referring to FIGS. 6 and 5a, the Tile Binning Algorithm determines if the size of a given bounding box exceeds a predetermined threshold, e.g., if the X-dimension of the bounding box exceeds a threshold and/or if the Y-dimension of the bounding box exceeds the same, or a different, threshold. If the size of the bounding box, for example the first bounding box 630, exceeds the threshold, then the Tile Binning Algorithm subdivides the initial polygon 612 into lower-level sub-polygons. What is meant by "lower-level" here is that, combined, the sub-polygons make up the undivided "parent" polygon and that each of the sub-polygons is smaller in area than its parent polygon. For example, the initial polygon 612 is subdivided into a second polygon 646 through a twelfth polygon 659.

The Tile Binning Algorithm may subdivide each polygon by obtaining the edges/vertices of the polygon. For example, the Tile Binning Algorithm may subdivide the initial polygon 612 by obtaining the vertices 660, 662 and 664 of the initial polygon 612. Note, a vertex may be a point formed by the intersection of two or more lines of the polygon. The Tile Binning Algorithm connects a point between the vertices 660, 662 and 664, such as the mid-points of each edge, to produce four new sub-polygons 646, 648, 650 and 652. The Tile Binning Algorithm selects two of these sub-polygons 652 and 650 based on their size and constructs a lower level bounding box around each sub-polygon 652, 650. Note, Sub-polygons 652, 656 stretch all the way to the bottom of the first polygon 612 at this point of the subdivision process. The Tile Binning Algorithm constructs the bounding box around each sub-polygon 652, 656 in the same manner as the initial bounding box 630 around the first polygon 612. Polygons 650 and 652 may be further subdivided in a similar manner to form eight sub divided polygons, 650–659. A sum of all tiles included in each final-level bounding boxes, 668–680, comprises fewer tiles than the first-level bounding box 630. For example, the seventh tile 682 would be in the initial bounding box 630 that forms around the initial polygon 612. However, the seventh tile 682 is not within any of subsequent bounding boxes 668-680 formed around the sub-divided polygons 650–659.

Thus, a sum of all tiles included in the lower-level bounding box comprises fewer tiles than the initial-level bounding box. The Tile Binning Algorithm unmarks tiles that were within the initial bounding box 630 but are not within the final bounding boxes 668–680. Eventually, merely the tiles that are marked are eventually rasterized onto the 2D display surface.

The Tile Binning Algorithm determines if there are any sub-polygons remaining from the subdivided polygons that have not yet been processed. If so, algorithm selects one of the remaining sub-polygons and subdivides the selected sub-polygon until the size of the bounding box is below a preset threshold. This process repeats itself until all of the sub-polygons have been processed.

The Tile Binning Algorithm may determine if the size of a bounding box around a sub-polygon exceeds the predetermined threshold during or after processing of the sub-polygons. Reducing the sizes of the bounding boxes reduces the number of tiles to which a polygon is assigned, and thus reduces the number of tiles that need to be rasterized when the image is displayed.

Referring to FIG. 5a in block 525, once the polygon binning process has been completed, the Tile Binning Algorithm implements a tile clipping process to remove unmarked tiles. The process excludes the unmarked tiles, meaning that the unmarked tiles are not rasterized. Rasterization takes place for a tile after the all triangles have been tested against that tile. The process rasterizes merely those tiles that are marked, which generally correspond to a polygon or portion(s) thereof. The Tile Based Clipping Algorithm clips individual polygons against the sides of each individual tile to which the polygon was assigned. The clipping algorithm will compute the intersection points of the polygon's sides against the tile sides. From these intersection points and the original polygon points, a small collection (typically [0 . . . 4]) of new polygons will be generated. These new polygons may be an exact representation of the original polygon for the specific tile, but are also perfectly contained within the tile. The Tile Binning Algorithm minimizes polygon submissions to the tile based clipping algorithm and thereby reduces the number of unnecessary triangle bin assignments that it produces.

In block 530, the Tile Binning Algorithm may determine bin assignments for the corresponding subdivided polygons by a number of methods. For example, the range of tiles and corresponding bin id's that fall within the accumulated final level of bounding boxes around each of the lowest level of subdivided polygons may be stored as the bin assignments for the sum of the sub divided polygons. Another example, the actual IDs of each bin that is touched by any of the lowest level of subdivided polygon after the binning process has occurred may be stored. Another example, the range of tiles and corresponding bin id's that fall within a bounding box for the first polygon top level axis aligned bounding box may be stored.

In block 535, the Tile Binning Algorithm creates an initial subdivision record for each initial level polygon intended to be subdivided that indicates the bin assignments for its corresponding subdivided polygons. Before rendering the first frame, the Tile Binning Algorithm creates a subdivision record for each polygon that must be subdivided and caches the results. The algorithm directs the construction of the normal data structures required for each bin as well as a subdivision record for each top level polygon that is to be subdivided. The subdivision record may also contain one or more reference coordinate points as discussed later. In an embodiment, the algorithm may direct the construction of the normal data structures required for each bin as well as a subdivision record for each polygon that is subdivided.

In block 540, the Tile Binning Algorithm stores the bin assignments that the corresponding subdivided polygons belong to in the initial subdivision record for the respective initial level polygon. As discussed, Bin IDs can be stored in a number of ways. Simply store the min/max range of IDs that fall within the top level axis aligned bounding box. Store a list of min/max ranges of the lowest level of subdivision. Store the actual IDs of each bin from the lowest level of subdivision.

In block 545, the Tile Binning Algorithm stores one or more reference coordinate points associated with the coordinates of each top level polygon. The one or more reference coordinate points associated with the coordinates of the polygon may be the vertices of the polygon, midpoints of the vertices of the polygon, a single point such as a centroid of a polygon, or other similar reference coordinate. The one or more reference coordinate points associated with the coordinates of each top level polygon may be stored in the sub record for that top level polygon. FIG. 4 illustrates the vertices 440–444 of a polygon and a centroid 486 of a polygon, which is the average value of the three vertices.

The Tile Binning algorithm could also store the one or more reference coordinate points associated with the coordinates of each sub divided polygon.

In block 550, the initial level polygons are rendered by rasterizing the tiles containing the polygons onto a display surface. The initial level polygons are stored in the frame buffer and then rendered.

In block 555, the Tile Binning Algorithm compares the one or more reference coordinate points associated with the coordinates of the initial polygon on the next frame to the stored one or more reference coordinate points from the previous frame.

In block 560, the Tile Binning Algorithm may reuse the bin assignments for the corresponding subdivided polygons for the next frame if the results of the comparison are within a preset threshold quantity. If the new reference coordinate point is within the preset threshold quantity proximity of the previously generated reference coordinate point, the Tile Binning algorithm forgoes the subdivision step and the determination of binning assignments and simply resubmits the polygon to the bins cached within the subdivision record. The preset threshold quantity may be an epsilon i.e. an arbitrarily small positive threshold quantity in mathematical analysis. Thus, spatially the initial polygon is occupying approximately the same space of the display screen from the last frame to this current frame.

The Tile Binning algorithm may forgo the subdivision step and the determination of binning assignments because even though most scenes are dynamic, object or camera movement between any two given frames is usually quite small. Due to these relatively small changes in position and orientation, many polygons rasterize to essentially the same screen location between any two frames. Furthermore, if the reference coordinate points for a given polygon are within epsilon of each other, the subdivision results should be approximately the same and that the polygon should have exactly the same binning assignment that it did in the previous frame.

In block 565, the Tile Binning Algorithm may create a second subdivision record for the initial level polygon that indicates new bin assignments for its corresponding subdivided polygons if the results of the comparison are above the preset threshold quantity. The subdivided bounding box procedure in block 520 may occur again to determine the new bin assignments. The bin assignment determination process in blocks 525 and 530 may occur again.

In block 570, the Tile Binning Algorithm may then store the one or more reference coordinate points associated with the new coordinates of the initial polygon to replace the initially stored reference coordinate points.

This method may reduce the amount of polygon information transfer bandwidth required by exploiting the spatial locality of polygons between frames. Furthermore, this method reduces the computation required to determine the polygon to bin assignment.

Referring to FIG. 6, an example of the savings realized for a single polygon is as follows. In the FIG. 6, the algorithm receives the three vertices (intersection points of the lines) of the polygon and compares the vertices to each tile to determine if the polygon truly crosses the tile boundary or not. Given the grid size 24×34 and the fact that each vertex is comprised of 12 bytes of floating point data, 24×34×36 bytes=29376 bytes of data is transmitted. By employing an axis aligned bounding box, the algorithm can reduce this to 19×31×36 bytes=21204 bytes of data. Two levels of subdivision will further reduce the amount of transmitted data to 14688 bytes that results in a 50% savings of transmitted data. Although this subdivision process of the polygon provides considerable savings for the binner, it should be noted that we still incur the processing cost of the actual subdivision for each polygon before rendering each frame.

Referring to FIG. 4, however, before subdividing each top level polygon, the algorithm creates a subdivision record and computes the reference coordinate points by, in this example, summing the three vertices and finding their average (shown with the calculation below).

reference coordinate point of $x=(v0.x+v1.x+v2.x)/3$;

reference coordinate point of $y=(v0.y+v1.y+v2.y)/3$;

reference coordinate point of $z=(v0.z+v1.z+v2.z)/3$

Using example, grid values the centroid 486 of the first polygon 410 may have the following example reference coordinate points.

The first vertices 440 has coordinates of {0.2, 0.4, 0.0};

The second vertices 442 has coordinates of {1.5, 0.2, 0.0}; and

The third vertices 444 has coordinates of ={0.4, 1.5, 0.0}.

Substituting the values into the equations yields:

reference coordinate point of $x=(0.2+1.5+0.4)/3=0.7$;

reference coordinate point of $y=(0.4+0.2+1.5)/3=0.7$; and reference coordinate point of $z=(0.0+0.0+0.0)/3=0.0$.

Thus, the stored reference coordinate points for the first polygon 410 would be 0.7, 0.7, 0.0.

The polygon's reference coordinate points been stored in the subdivision record. The polygon's bin assignments have been computed per one of the methods mentioned in blocks 530 & 540 and stored in the record. Thus, on subsequent frames, before each polygon is subdivided again, the algorithm first computes its new reference coordinate points and checks to see if it is within epsilon proximity of the previous reference coordinate points. If so, it means that the polygon will be rasterized to essentially the same position on screen (viewpoint is static or has only moved very minimally) so that the algorithm is able to simply resubmit the stored bin assignments to the binner and move on to the next polygon, thereby saving the cost of recomputing the entire subdivision tree.

The Pseudo code below computes whether a new reference coordinate point associated with the polygon requires subdivision.

```
{
    Compute new Reference Coordinate Point (RCP(current))
    if absolute value of (RCP (current) – RCP (previous)) > EPSILON
    {
        Create a new Subdivision Record
        /* Do subdivision */
        Construct the axis aligned bounding box for the polygon
        Mark all tiles contained within the bounding box
        If either of the {x, y} dimensions of the bounding box are
        greater than a specified threshold subdivide the polygon into
        four new polygon
            Compute the midpoints along each of the three line
            segments of the polygon
            Connect the three midpoints to form three new
            exterior polygons and one new interior polygon
            Generate new axis aligned bounding boxes for the
            exterior polygons
            Unmark any tiles from the original bounding box that
```

```
        are not contained in any of three new bounding boxes
        For each bounding box go to the dimension checking
          step above
        Store the bin assignment in the subdivision record
    }
    else
    {
        Resubmit polygon to the bins stored in subdivision record
    }
}
```

Figure 7:
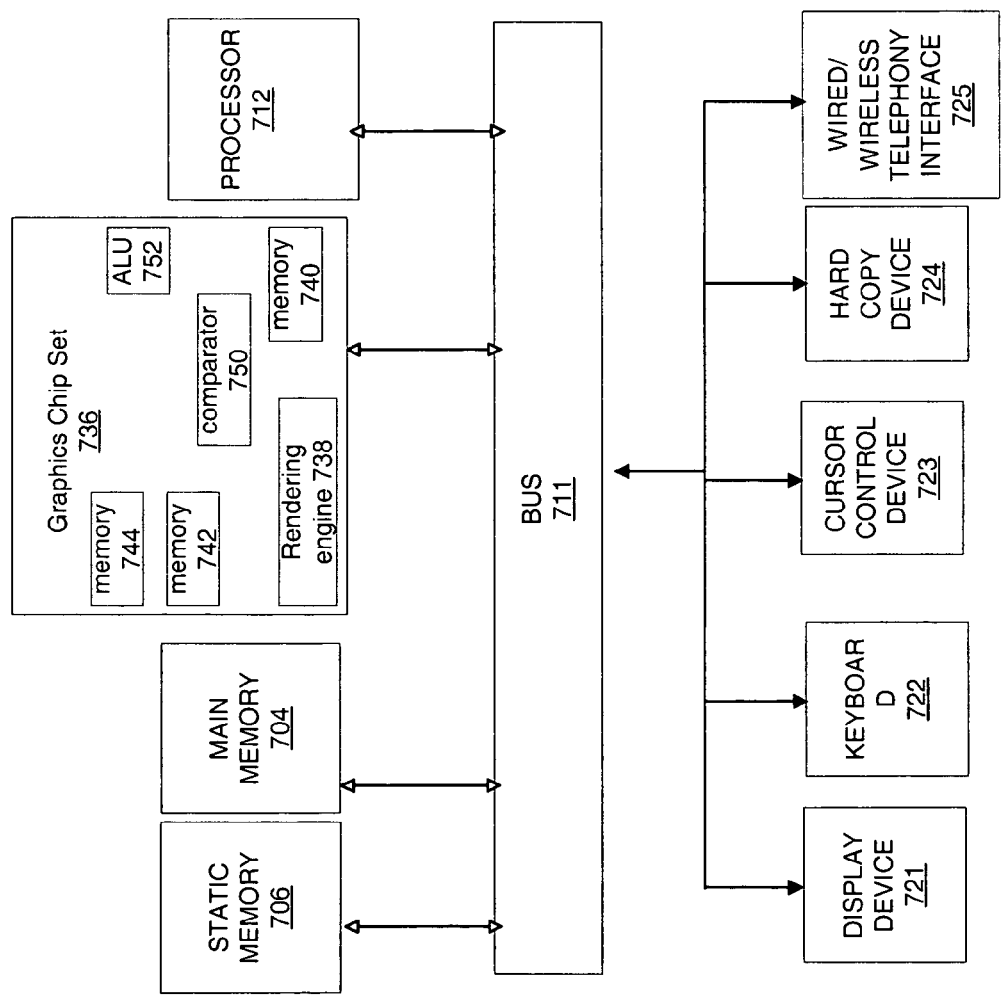
FIG. 7 illustrates a block diagram of an example computer system that may use a tile based rendering algorithm that divides an initial polygon into two or more subsequent polygons smaller in individual area than the initial polygon and that shares polygons bin assignments across multiple rendering frames.

FIG. 7 illustrates a block diagram of an example computer system that may use a tile based rendering algorithm that divides an initial polygon into two or more subsequent polygons smaller in individual area than the initial polygon and that shares polygons bin assignments across multiple rendering frames. In one embodiment, computer system 700 comprises a communication mechanism or bus 711 for communicating information, and an integrated circuit component such as a processor 712 coupled with bus 711 for processing information. One or more of the components or devices in the computer system 700 such as the processor 712 or a chip set 736 that may have a graphics rendering engine configured to implement a tile based rendering algorithm that divides an initial polygon into two or more subsequent polygons smaller in individual area then the initial polygon and that decides which polygons belong to which bins.

The graphics rendering engine 738 implementing a tile based rendering algorithm may also include a first memory 740, such as a cache, buffer, register or other similar storage device, to store rendered polygon information from the previous frame including bin assignments. A second memory 742 associated with the graphics rendering engine 738 may store frame to frame subdivision results of the subdivided polygons. A comparator 750 in the software or the hardware compares the reference coordinate point information. An arithmetic logic unit 752 in the chipset or in a processor performs the subdivision calculations of the polygons and the reference coordinate point calculations. The tile based rendering algorithm may be implemented as logic, software, and/or a combination of logic and software.

As noted previously, the rasterization engine may take as parameters a list of 2D polygons in screen space coordinates and a list of 2D vertices with vertex attributes. The Vertex attributes may include: 2D position, Z Depth, RGB Vertex Color (from lighting computation or user input), 2D Texture Coordinates, a per Vertex Alpha value, and other similar values. The Alpha value may be an eight bit quantity and can be stored with the color values RGB to be thirty-two bit aligned.

Computer system 700 further comprises a random access memory (RAM), or other dynamic storage device 704 (referred to as main memory) coupled to bus 711 for storing information and instructions to be executed by processor 712. Main memory 704 also may be used for storing temporary variables or other intermediate information during execution of instructions by processor 712. Main memory 704 also may be used for storing 3D data that defines the 3D model. Significant bandwidth may be required to transmit geometry information to the graphics hardware in the Graphics Chip Set. A second memory 742 in the Chip set may store the rendering information from a previously rendered frame. The results of the comparison by the comparator may determine whether the rendering information from a previously rendered frame are reused or new modeling data is obtained from the Main memory 704. Typically, all scene polygons are required by the graphics hardware to render each frame of the scene even if a scene is static. A third memory 744, such as a frame buffer, may store the current rendering polygon information. The first memory 740 stores the rendered polygon information including bin assignments from the previous frame. In an embodiment, the Processor 712 may include a microprocessor, but is not limited to a microprocessor, such as a Pentium IV, etc. The computer system may be implemented as a desk top, handheld, laptop, or other similar device.

In an embodiment, the performance gain will be highly dependent upon the scene content and current camera motion, but for relatively static scenes the savings could be substantial. As a hypothetical example, consider a scene with 10,000 rendered polygons. Assume that the camera motion is relatively slow and incremental and that between two frames, 20% of the rendered polygons are changing not at all or below the preset error threshold; thus 2000 polygons are not changing. Furthermore, assume that in order to correctly bin assign these polygons, the algorithm had to subdivide and average of 2 levels of subdivision on each initial polygon. In general, the number of vertices produced by subdivision is 3(subdivision level). Thus, in this example, this algorithm can alleviate a redundant computation of 32*2000=18,000 vertices. To compute a subdivision vertex generally requires 3 adds and 3 divides. Thus, the algorithm potentially saves 54,000 adds and 54,000 divides per frame in this example. Additionally the hardware need not re-transmit the vertices information over the graphics bus since the last frame's computation cached them in graphics memory on the graphics device.

The algorithm merely expends the cost of computing the reference coordinate points and the comparison (9 adds and 3 divides) as well as stores the frame to frame subdivision results in potentially dedicated memory.

Computer system 700 also comprises a read only memory (ROM) and/or other static storage device 706 coupled to bus 711 for storing static information and instructions for processor 712, and a mass storage memory, 704 such as a magnetic disk or optical disk and its corresponding disk drive. Mass storage memory 704, is coupled to bus 711 for storing information and instructions.

Computer system 700 may further be coupled to a display device 721, such as a cathode ray tube (CRT) or liquid crystal display (LCD), coupled to bus 711 for displaying information to a computer user. An alphanumeric input device (keyboard) 722, including alphanumeric and other keys, may also be coupled to bus 711 for communicating information and command selections to processor 712. An additional user input device is cursor control device 723, such as a mouse, trackball, trackpad, stylus, or cursor direction keys, coupled to bus 711 for communicating direction information and command selections to processor 712, and for controlling cursor movement on a display device 712.

Another device that may be coupled to bus 711 is a hard copy device 724, which may be used for printing instructions, data, or other information on a medium such as paper, film, or similar types of media. Furthermore, a sound recording and playback device, such as a speaker and/or microphone (not shown) may optionally be coupled to bus 711 for audio interfacing with computer system 700. Another device that may be coupled to bus 711 is a wired/wireless communication capability 725 to communication to a phone.

In one embodiment, the software used to facilitate the algorithm can be embodied onto a machine-readable medium. Thus, a machine-readable medium includes any mechanism that provides (i.e., stores and/or transmits) information in a form accessible by a machine (e.g., a computer, network device, personal digital assistant, manufacturing tool, any device with a set of one or more processors, etc.). For example, a machine-readable medium includes recordable/non-recordable media (e.g., read only memory (ROM); random access memory (RAM); magnetic disk storage media; optical storage media; flash memory devices; etc.), as well as electrical, optical, acoustical or other form of propagated signals (e.g., carrier waves, infrared signals, digital signals, etc.); etc.

While some specific embodiments of the invention have been shown the invention is not to be limited to these embodiments. For example, the blocks of FIGS. 5a–5c may be rearranged and/or executed out of order to produce a similar result. The first memory, second memory and third memory may be combined into a single memory with dedicated sections or something similar. The polygon binning process may be applied to tile based rendering, classic rendering process, or a similar rendering process. The invention is to be understood as not limited by the specific embodiments described herein, but only by scope of the appended claims.

We claim:

1. An apparatus, comprising:
   a graphics rendering engine configured to implement a tile based rendering algorithm that divides an initial polygon into two or more subsequent polygons smaller in individual area than the initial polygon and that shares polygon bin assignments across multiple rendering frames; and
   a memory to store a record associated with the initial polygon that contains one or more reference coordinate points and a list of bins that the two or more subsequent polygons should be submitted to,
   wherein the memory is to store bin assignments of subdivided polygons derived from a first polygon, and one or more reference coordinate points associated with coordinates of the first polygon; and
   wherein the engine is configured to compare one or more reference coordinate points associated with the coordinates of the first polygon on a subsequent frame to the stored one or more reference coordinate points from a previous frame, and to reuse the bin assignments for the corresponding subdivided polygons for the subsequent frame if the results of the comparison are within a preset threshold quantity.

2. The apparatus of claim 1, wherein the tile based rendering algorithm determines which polygons belong to which bins based on the polygon's display screen space location.

3. The apparatus of claim 1, wherein the tile based rendering algorithm is implemented at least in part as logic.

4. The apparatus of claim 1, wherein the tile based rendering algorithm is implemented at least in part as driver software.

5. A program storage device readable by a machine, tangibly embodying a program of instructions executable by the machine to perform a method for rendering a computer graphics image, the method including:
   storing bin assignments of subdivided polygons derived from a first polygon;
   storing one or more reference coordinate points associated with coordinates of the first polygon;
   comparing one or more reference coordinate points associated with the coordinates of the first polygon on a subsequent frame to the stored one or more reference coordinate points from a previous frame; and
   reusing the bin assignments for the corresponding subdivided polygons for the subsequent frame if the results of the comparison are within a preset threshold quantity.

6. The method of claim 5, further comprising:
   creating a first subdivision record for the first polygon intended to be subdivided that indicates bin assignments for its corresponding subdivided polygons.

7. The method of claim 5, further comprising:
   creating a second subdivision record that stores for the first polygon new bin assignments for its corresponding subdivided polygons if the results of the comparison are above the preset threshold quantity.

8. The method of claim 5, further comprising:
   dividing the first polygon into two or more subsequent polygons smaller in individual area than the first polygon.

9. The method of claim 5, further comprising:
   generating a bounding box around each of a lowest divided level of the subdivided polygons; and
   calculating bin assignments for the corresponding subdivided polygons by storing a range of tiles that fall within the aggregated bounding boxes around each of the lowest level of subdivided polygons.

10. The method of claim 5, further comprising:
    determining bin assignments for the corresponding subdivided polygons by storing actual IDs of each bin crossing one or more subdivided polygons after the binning process has occurred.

11. An apparatus, comprising:
    means for storing bin assignments of subdivided polygons derived from a first polygon;
    means for storing one or more reference coordinate points associated with coordinates of the first polygon;
    means for comparing one or more reference coordinate points associated with the coordinates of the first polygon on a subsequent frame to the stored one or more reference coordinate points from a previous frame; and
    means for reusing the bin assignments for the corresponding subdivided polygons for the subsequent frame if the results of the comparison are within a preset threshold quantity.

12. The apparatus of claim 11, further comprising:
    means for creating a first subdivision record for the first polygon intended to be subdivided that indicates bin assignments for its corresponding subdivided polygons.

13. The apparatus of claim 11, further comprising:
    means for creating a second subdivision record that stores for the first polygon new bin assignments for its corresponding subdivided polygons if the results of the comparison are above the preset threshold quantity.

14. The apparatus of claim 11, further comprising:
    means for dividing the first polygon into two or more subsequent polygons smaller in individual area than the first polygon.

15. The apparatus of claim 11, further comprising:
    means for generating a bounding box around each of a lowest divided level of the subdivided polygons; and
    means for calculating bin assignments for the corresponding subdivided polygons by storing a range of tiles that fall within the aggregated bounding boxes around each of the lowest level of subdivided polygons.

16. The apparatus of claim 11, further comprising:
means for determining bin assignments for the corresponding subdivided polygons by storing actual IDs of each bin crossing one or more subdivided polygons after the binning process has occurred.

17. A method, comprising:
creating a first subdivision record for a first polygon intended to be subdivided that indicates bin assignments for subdivided polygons derived from the first polygon;
storing the bin assignments that the corresponding subdivided polygons belong to in the first subdivision record;
storing one or more reference coordinate points associated with the coordinates of the first polygon in the first subdivision record;
rendering the first polygon;
comparing one or more reference coordinate points associated with the coordinates of the first polygon on a subsequent frame to the stored one or more reference coordinate points from a previous frame; and
reusing the bin assignments for the corresponding subdivided polygons on the subsequent frame if the results of the comparison are within a preset threshold quantity.

18. The method of claim 17, further comprising:
determining one or more reference coordinate points associated with the coordinates of the polygon.

19. The method of claim 17, wherein the one or more reference coordinate points associated with the coordinates of the first polygon may be selected from the group consisting of vertices of the polygon, midpoints of the vertices of the polygon, and a centroid of a polygon.

20. A system, comprising:
a graphics rendering engine configured to implement a tile based rendering algorithm that divides an initial polygon into two or more subsequent polygons smaller in individual area than the initial polygon as well as that shares polygon bin assignments across multiple rendering frames; and
a first memory to store rendered polygon information from a previous frame including bin assignments of the polygons,
wherein the first memory is to store bin assignments of subdivided polygons derived from a first polygon, and one or more reference coordinate points associated with coordinates of the first polygon; and
wherein the engine is configured to compare one or more reference coordinate points associated with the coordinates of the first polygon on a subsequent frame to the stored one or more reference coordinate points from a previous frame, and to reuse the bin assignments for the corresponding subdivided polygons for the subsequent frame if the results of the comparison are within a preset threshold quantity.

21. The system of claim 20, further comprising:
a comparator to compare reference coordinate point information of the initial polygon from a previous frame to a current frame.

22. The system of claim 20, further comprising:
a second memory to store frame to frame subdivision results of the two or more subsequent polygons.

\* \* \* \* \*